(12) United States Patent
Bifulco et al.

(10) Patent No.: US 11,834,997 B2
(45) Date of Patent: Dec. 5, 2023

(54) FACE SHEET OF ACOUSTIC LINER HAVING STREAMLINED HOLES WITH ELONGATED EDGES

(71) Applicant: RTX Corporation, Farmington, CT (US)

(72) Inventors: Anthony R. Bifulco, Ellington, CT (US); Michael Raymond LaFavor, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/732,996

(22) Filed: Apr. 29, 2022

(65) Prior Publication Data
US 2023/0349330 A1  Nov. 2, 2023

(51) Int. Cl.
*F02C 7/24* (2006.01)
*B33Y 80/00* (2015.01)

(52) U.S. Cl.
CPC ............... *F02C 7/24* (2013.01); *B33Y 80/00* (2014.12); *F05D 2230/31* (2013.01); *F05D 2250/141* (2013.01); *F05D 2250/191* (2013.01); *F05D 2250/292* (2013.01); *F05D 2260/96* (2013.01)

(58) Field of Classification Search
CPC .. F02C 7/24; F02C 7/045; F02K 1/827; F02K 1/34; B64D 33/06; F05D 2230/31; F05D 2250/141; F05D 2250/191; F05D 2250/292; F05D 2260/96
See application file for complete search history.

(56) References Cited

U.S. PATENT DOCUMENTS

| | | | |
|---|---|---|---|
| 6,206,136 B1 * | 3/2001 | Swindlehurst | G10K 11/172 181/290 |
| 10,961,913 B2 | 3/2021 | Howarth et al. | |
| 11,261,794 B2 | 3/2022 | Matsuyama et al. | |
| 11,536,174 B2 * | 12/2022 | Bertoldi | F01N 1/04 |
| 2013/0263601 A1 * | 10/2013 | Richardson | F02C 7/047 60/722 |
| 2017/0121030 A1 * | 5/2017 | Pastouchenko | B64D 27/16 |
| 2018/0016987 A1 * | 1/2018 | Howarth | F02C 7/045 |
| 2020/0165954 A1 | 5/2020 | Lauder et al. | |
| 2020/0232357 A1 * | 7/2020 | Bertoldi | F01N 1/026 |
| 2021/0355880 A1 * | 11/2021 | Berkey | F02K 1/827 |
| 2022/0025814 A1 | 1/2022 | Wood et al. | |

FOREIGN PATENT DOCUMENTS

WO 2019225293 A1 11/2019

* cited by examiner

*Primary Examiner* — Todd E Manahan
*Assistant Examiner* — Rodolphe Andre Chabreyrie
(74) *Attorney, Agent, or Firm* — CANTOR COLBURN LLP

(57) ABSTRACT

A face sheet of an acoustic liner for a gas turbine engine, having: a first surface, a second surface, and a sheet body extending from the first surface to the second surface; a forward end, an aft end, and the sheet body extending from the forward end to the aft end; and a hole formed in the sheet body, extending from the first surface to the second surface, the hole defining a hole opening at the first surface of the face sheet, and an elongated edge that extends aft at the hole opening, wherein the elongated edge defines a flow ramp surface that tapers toward the first surface and is configured to direct flow toward the first surface, wherein the flow ramp surface is a streamlining feature.

19 Claims, 6 Drawing Sheets

FACE SHEET OF ACOUSTIC LINER HAVING STREAMLINED HOLES WITH ELONGATED EDGES

BACKGROUND

Exemplary embodiments pertain to the art of noise treatment and more specifically to a face sheet for an acoustic liner for a gas turbine engine, the face sheet having streamlined holes formed with elongated edges.

In a gas turbine engine, an acoustic treatment along a nacelle or other engine component (i.e., a flowpath along a case, vanes, struts, panels, and the like) may involve an acoustic panel or liner having a face sheet that resides along a flow path. The face sheet may be perforated with a series of through-holes (otherwise referred to as holes or passages). These holes may be round, though slotted or other shapes may be utilized. As flow passes over the surface of the acoustic panel, the flow encounters these openings and becomes disturbed. That is, the flow may become turbulent which may reduce engine overall performance. This disturbance may be attributed to the flow-side shape of the hole and to diffusion of air across a gap defined by the hole. Larger holes, or wider slots, result in a greater flow diffusion along the flow direction, which may increase the impact of turbulence.

BRIEF DESCRIPTION

Disclosed is a face sheet of an acoustic liner for a gas turbine engine, including: a first surface, a second surface, and a sheet body extending from the first surface to the second surface; a forward end, an aft end, and the sheet body extending from the forward end to the aft end; and a hole formed in the sheet body, extending from the first surface to the second surface, the hole defining a hole opening at the first surface of the face sheet, and an elongated edge that extends aft at the hole opening, wherein the elongated edge defines a flow ramp surface that tapers toward the first surface and is configured to direct flow toward the first surface, wherein the flow ramp surface is a streamlining feature.

In addition to one or more of the above features of the face sheet, or as an alternate, the streamlining feature is aligned with a direction of flow over the face sheet.

In addition to one or more of the above features of the face sheet, or as an alternate, the streamlining feature is offset from a direction of flow over the face sheet.

In addition to one or more of the above features of the face sheet, or as an alternate, the hole of the face sheet is defined by: a first end at the first surface of the sheet body, a second end at the second surface of the sheet body, a hole wall extending from the first end to the second end, and the hole opening defined by the hole wall at the first surface, wherein the hole opening defines a first open area, the hole wall defines a second open area intermediate the first and second surfaces, and the first open area is larger than the second open area to define the elongated edge.

In addition to one or more of the above features of the face sheet, or as an alternate, the elongated edge includes a forward end that is spaced apart from the first surface by a first distance, and an aft end that is aft of the forward end by a second distance and is level with the first surface, thereby forming the flow ramp surface.

In addition to one or more of the above features of the face sheet, or as an alternate, a lengthwise span of the elongated edge is proportional to a lengthwise opening span of the hole opening, whereby the elongated transition edge defines a widthwise taper toward the aft end.

In addition to one or more of the above features of the face sheet, or as an alternate, hole opening is a circular shape, so that a teardrop shape is formed by the widthwise taper.

In addition to one or more of the above features of the face sheet, or as an alternate, the hole opening defines a slot shape, so that a width-wise center region of the elongated edge forms a constant length ramp.

In addition to one or more of the above features of the face sheet, or as an alternate, the face sheet includes a plurality of the holes distributed about the face sheet.

Disclosed is a gas turbine engine including: an engine component, the engine component including a flow facing side, an acoustic liner disposed against the flow facing side, wherein the acoustic liner includes body and a face sheet, and the face sheet includes: a first surface, a second surface, and a sheet body extending from the first surface to the second surface, wherein the first surface is a flow facing surface and the second surface faces the body of the acoustic liner; a forward end, an aft end, and the sheet body extending from the forward end to the aft end; and a hole formed in the sheet body, extending from the first surface to the second surface, the hole defining a hole opening at the first surface of the face sheet, and an elongated edge that extends aft at the hole opening, wherein the elongated edge defines a flow ramp surface that tapers toward the first surface and is configured to direct flow toward the first surface.

In addition to one or more of the above features of the engine, or as an alternate, the hole of the face sheet is defined by: a first end at the first surface of the sheet body, a second end at the second surface of the sheet body, a hole wall extending from the first end to the second end, and the hole opening defined by the hole wall at the first surface, wherein the hole opening defines a first open area, the hole wall defines a second open area intermediate the first and second surfaces, and the first open area is larger than the second open area to define the elongated edge.

In addition to one or more of the above features of the engine, or as an alternate, the elongated edge includes a forward end that is spaced apart from the first surface by a first distance, and an aft end that is aft of the forward end by a second distance and is level with the first surface, thereby forming the flow ramp surface.

In addition to one or more of the above features of the engine, or as an alternate, a lengthwise span of the elongated edge is proportional to a lengthwise opening span of the hole opening, whereby the elongated edge defines a widthwise taper toward the aft end.

In addition to one or more of the above features of the engine, or as an alternate, the hole opening is a circular shape, so that a teardrop shape is formed by the taper of the elongated edge.

In addition to one or more of the above features of the engine, or as an alternate, the hole opening defines a slot shape, so that a width-wise center region of the elongated edge forms a constant length ramp.

In addition to one or more of the above features of the engine, or as an alternate, the engine includes a plurality of the holes distributed about the face sheet.

In addition to one or more of the above features of the engine, or as an alternate, the engine component is a nacelle.

Disclosed is a method of manufacturing a face sheet of an acoustic liner for a gas turbine engine, including: defining a sheet body, of a face sheet, that extends from a first surface to a second surface and from a forward end to an aft end; defining a hole in the sheet body, extending from the first surface to the second surface, the hole defining a hole opening at the first surface of the face sheet, and an elongated edge that extends aft at the hole opening, wherein the elongated edge defines a flow ramp surface that tapers toward the first surface and is configured to direct flow toward the first surface; and additively manufacturing the face sheet.

In addition to one or more of the above features of the method, or as an alternate, the method includes defining a lengthwise span of the elongated edge that is proportional to a lengthwise opening span of the hole opening, whereby the elongated transition edge defines a widthwise taper toward the aft end.

In addition to one or more of the above features of the method, or as an alternate, the method includes defining the hole opening that is a circular shape, so that a teardrop shape is defined by the widthwise taper; or defining the hole opening that is a slot shape, so that a width-wise center region of the elongated edge defines a constant length ramp.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
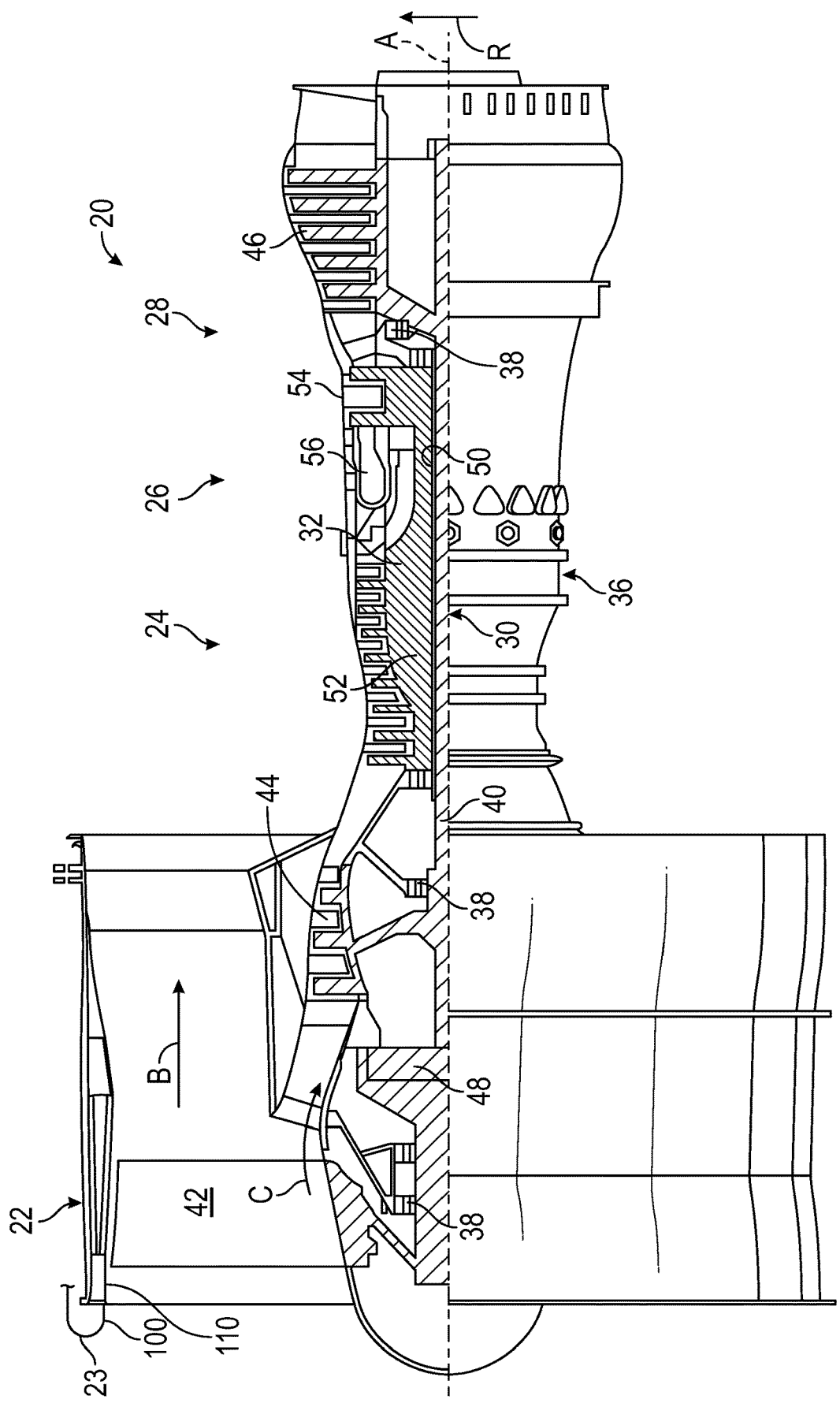
FIG. 1 is a partial cross-sectional view of a gas turbine engine, according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A (engine radial axis R is also illustrated in FIG. 1) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

As shown in FIG. 1, a nacelle 23 of the gas turbine engine 20 includes a flow facing surface 100 with an acoustic liner 110 disposed against it, at the fan section 22. The acoustic liner 110 may be integrated into a flow facing surface of any component of the gas turbine engine 20 that would typically receive such a liner.

Figure 2A:
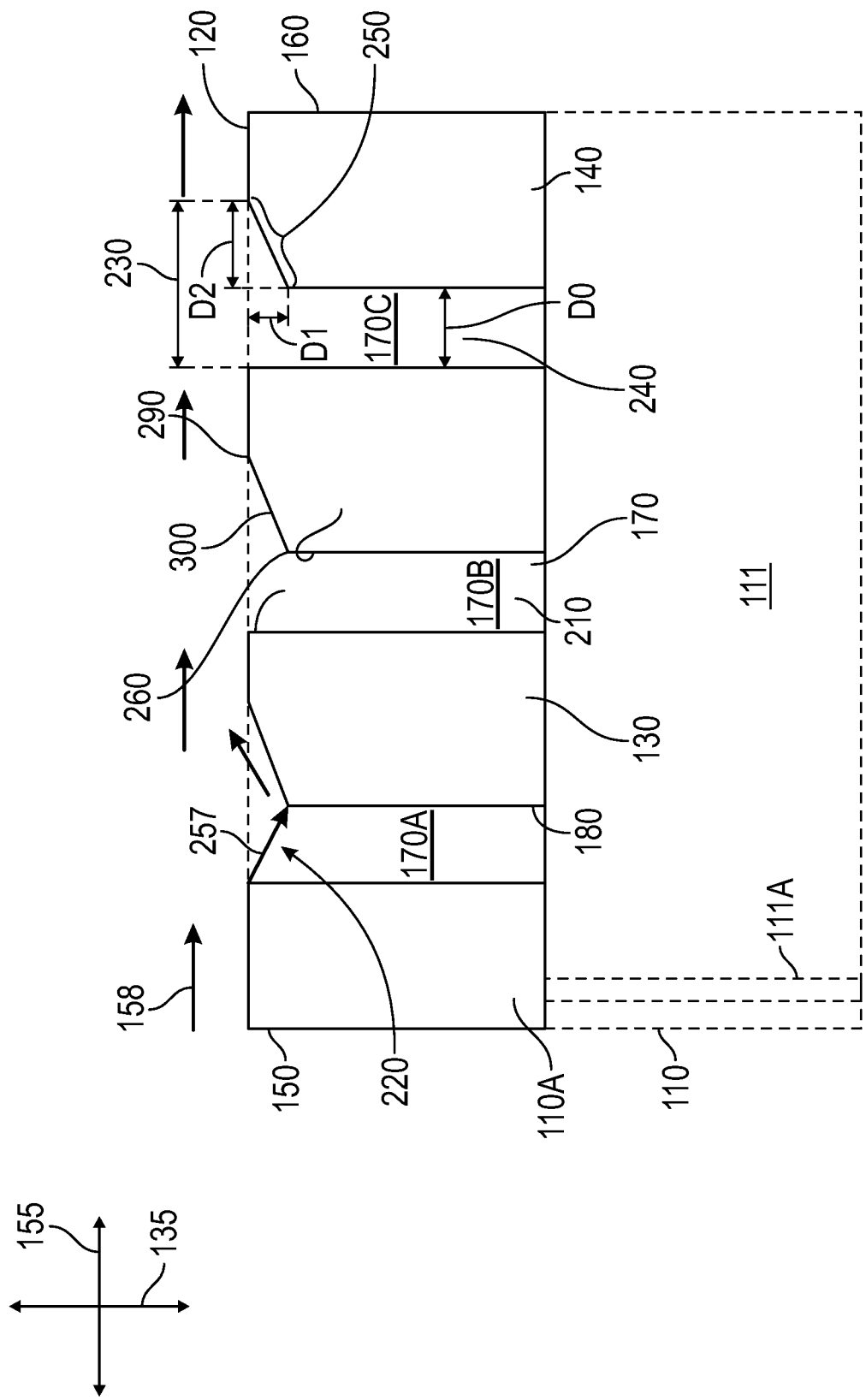
FIG. 2A is a sectional view along path of flow over a face sheet of an acoustic liner for the gas turbine engine having holes formed with elongated edges, according to an embodiment.

Turning to FIG. 2A, additional features of the acoustic liner 110 are shown. The acoustic liner 110 has a liner body 111, e.g., with cells 111A (only one cell is shown for simplicity) formed therein, and a face sheet 110A on its flow facing side. The face sheet 110A has a first surface 120, which is a flow facing surface of the face sheet 110A. A sheet body 130 extends depth-wise, e.g., in the depth-wise direction 135 that is parallel to an engine radial axis R (FIG. 1), from the first surface 120 to a second surface 140. The second surface 140 faces the body 111 of the acoustic liner 110. The sheet body 130 extends lengthwise, e.g., in the lengthwise direction 155 that is parallel to the engine central longitudinal axis (FIG. 1), from a forward end 150 to an aft end 160. In operation, flow 158 travels along the face sheet 110A from its forward end 150 to its aft end 160.

A through-hole (otherwise referred to as a hole or passage) 170 is formed in the sheet body 130. More specifically, the face sheet 110A may include a plurality of the holes 170A-C, distributed about the face sheet 110A. Each of the holes 170A-C may have a same shape and configuration, so that for simplicity reference herein will be to the hole 170. The hole 170 is defined by a hole wall 180 (or passage wall). The hole wall 180 extends depth-wise from a first end 200 (e.g., its outer end or flow facing end) at the first surface 120 of the sheet body 130 to a second end 210 (e.g., its inner end or liner body facing end) at the second surface 140 of the sheet body 130. A hole opening 220 (or passage opening) is defined by the hole wall 180 at the first surface 120, e.g., is flow facing side.

As provided with the following disclosure, the face sheet 110A of the acoustic liner 110 may be configured to provide for enhanced streamlining over gaps defined by the hole opening 220, minimizing a flow path disturbance. Specifically, the hole opening 220 defines a first open area 230. The hole wall 180 defines a second open area 240 intermediate the first and second surfaces 120, 140. The first open area 230 is larger than the second open area 240. That is, the hole opening 220 is larger than the reminder of the hole 170 in that it extends in the aft direction, as discussed below, to enable a smooth airflow over the hole opening 220.

More specifically, a streamlined and elongated transition edge 250 (for simplicity, an elongated edge 250) is formed along an aft portion 260 of the first end 200 of the hole wall 180. The elongated edge 250 includes a forward end 270 that is depth-wise spaced apart from the first surface 120 by a first distance D1, to define its depth-wise opening span. The elongated edge 250 includes an aft end 290 that is lengthwise aft of the forward end 270 of the elongated edge 250 by a second distance D2 and is level with the first surface 120, to define its lengthwise span. As shown in the figure, D2 is greater than D1 to define an acute angle to the direction of flow 158 outside the hole 170, but this is not intended on limiting the scope of the embodiments. With this configuration, the elongated edge 250 is a streamlining feature that tapers toward its aft end 290 to form a flow ramp surface 300 that extends in (e.g., is aligned with) the direction of flow and that is configured to direct flow 158 toward the first surface 120. However, in alternative embodiments, the streamlining feature is not aligned, e.g., it is offset, from the direction of flow, though aligned is considered a preferred embodiment.

In one embodiment, the hole wall 180 has a constant shape between the second end 210 of the hole 170 and the elongated edge 250. For example, the hole wall 180 defines a honeycomb shape between the second end 210 of the hole 170 and the elongated edge 250. Alternatively, as shown in FIG. 3, the hole wall 180 defines a cylindrical shape, e.g., with a circular cross section, between the second end 210 of the hole 170 and the elongated edge 250.

Figure 3:
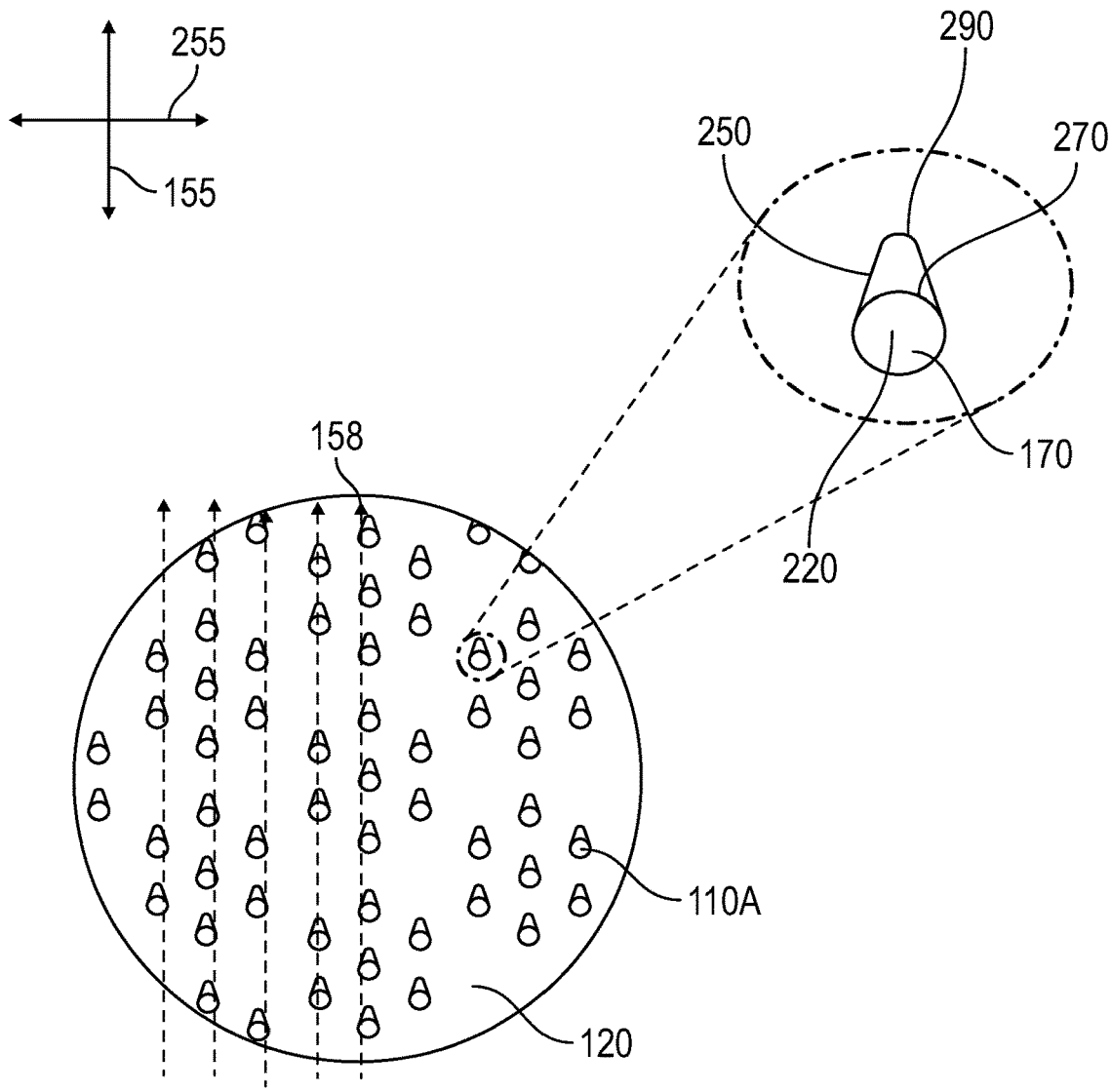
FIG. 3 is a plan view of the face sheet of the acoustic liner where the holes are round.

As shown in FIG. 3 the elongated edge 250 also tapers widthwise, e.g., in the widthwise direction 255 that is parallel to an engine circumferential direction, from its forward end 270 toward its aft end 290. Thus, the elongated edge 250 forms an effective funnel or frustoconical shape for directing flow over the first surface 120, out of the hole opening 220. In one embodiment, as shown in FIG. 3, a teardrop shape is formed by the widthwise taper of the elongated edge 250.

Figure 2B:
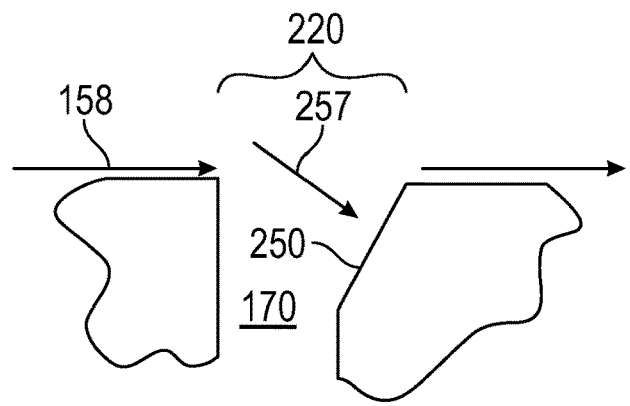
FIG. 2B shows an example of a streamline flow traveling toward an opening edge of the hole where the configuration is such that the streamline and edge are mutually perpendicular.

It is to be appreciated that the configuration of the embodiments is not limited to engine components that experience flow only along the engine axial direction. Rather the configuration of the embodiments is applicable to components where flow swirls result in flow traveling both axially and circumferentially, such as in regions of the engine between the fan and the fan exit guide vanes. The effect of the configuration of the embodiments is to direct flow along a path 257 (FIG. 2A) that defines a shortest open distance for the flow across the hole opening 220. For example, as shown in FIG. 2B, in one embodiment, the long end of the opening 220 of a hole 170 is perpendicular to the flow streamline 257 of the flow 158. Further, as illustrated in FIGS. 2A and 2B, a short gap of the opening 220 is generally aligned with the flow making the long end of the opening 220 perpendicular to the flow.

Figure 4:
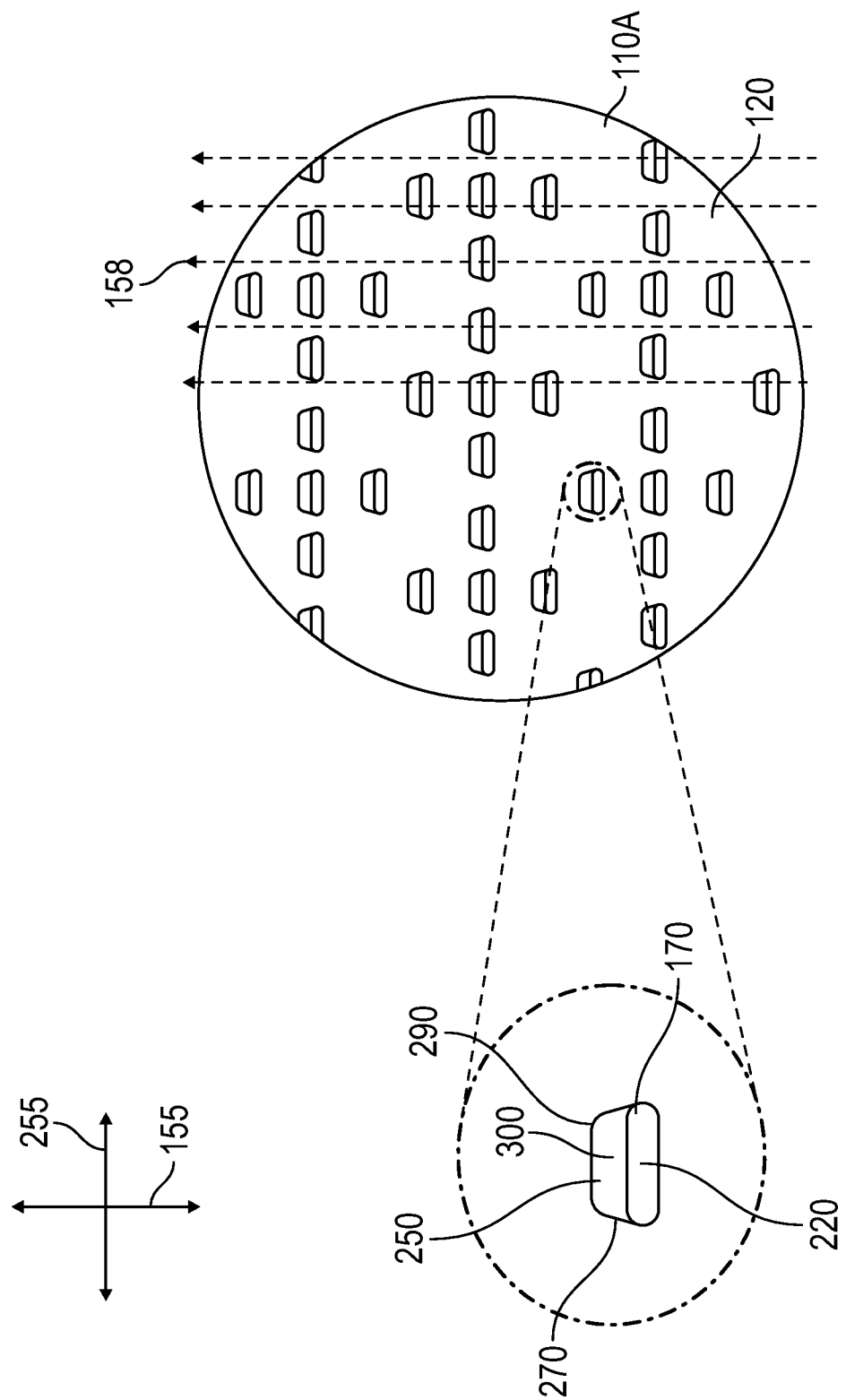
FIG. 4 is a plan view of the face sheet of the acoustic liner where the holes are slot-shaped.

In one embodiment, as shown in FIG. 4, the hole wall 180 defines a widthwise extending slot between the second end 210 of the hole 170 and the elongated edge 250. The same tapering of the elongated edge 250 is provided though the aft extension of the elongated edge 250, along the lengthwise direction 155, is relatively shorter than it is for the cylindrically shaped hole 170. For example, the length to width ratio of the elongated edge 250 may be substantially 1:2 for the slot shaped hole 170, such that the flow ramp surface 300 may be considered angled, while it may be substantially 1:1 for the cylindrically shaped hole 170.

Figure 4A:
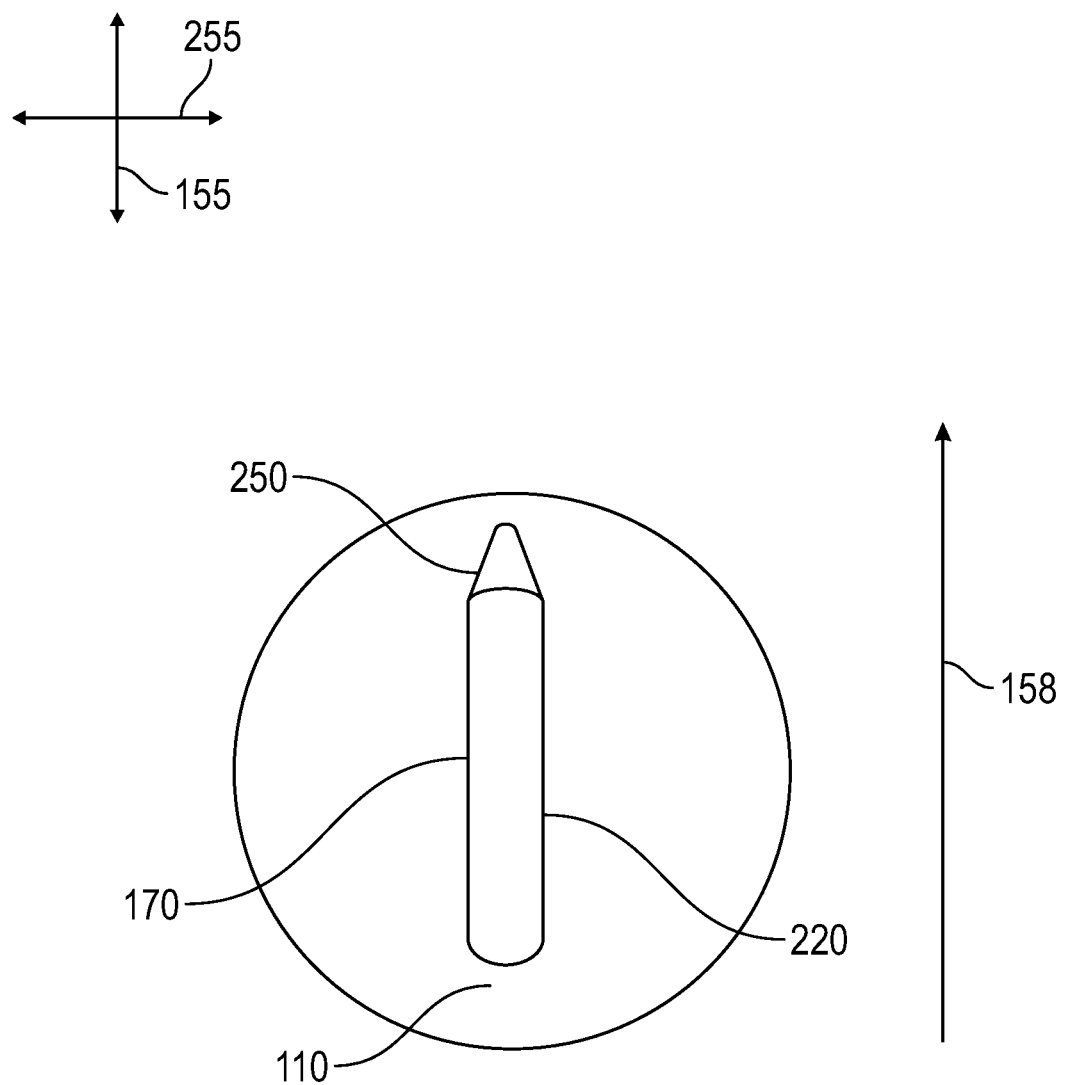
FIG. 4A shows the hole in the shape of a race-track.

In addition, the opening 220 defines a lengthwise opening span D0. The lengthwise span D2 of the elongated edge 250 may be proportional to the lengthwise opening span D0 of the opening 220 at each width-wise position of the opening 220. Thus, for a circular or hexagonal shaped opening 220, the elongated edge 250 may form a teardrop shaped ramp (FIG. 3). In comparison, the elongated edge 250 may form a substantially constant length ramp along a widthwise center region of the slot shaped opening 220 (FIG. 4). Other ramp shapes are within the scope of the disclosure. For example, FIG. 4A shows the hole 170 in the sheet 110A in the form of a race track, where the length in the direction of flow 158 is much greater than the width. The transition edge 250 of the opening 220 is similar to the shape shown in FIG. 3 for the circular opening.

Figure 5:
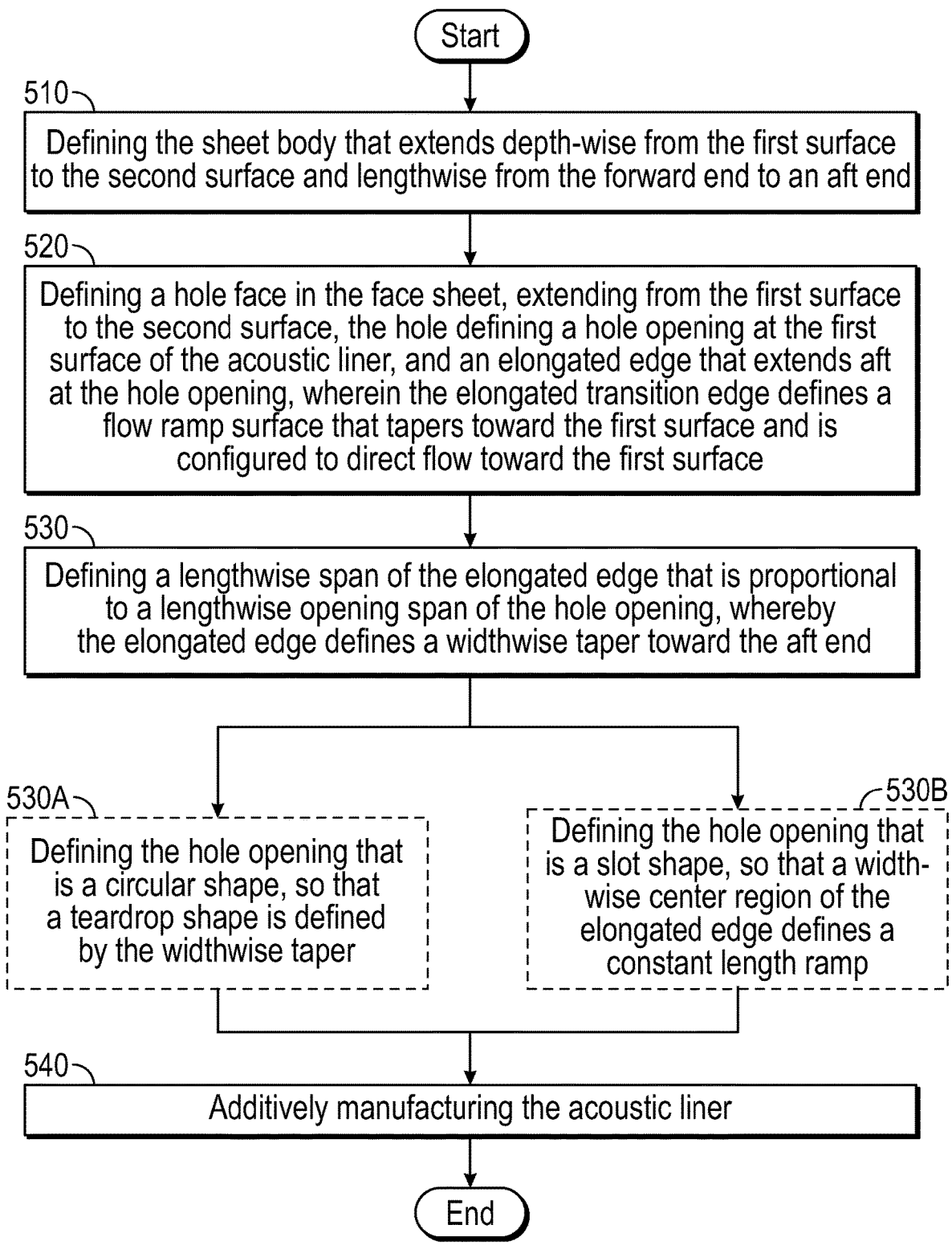
FIG. 5 is a flowchart showing a method of manufacturing a face sheet of an acoustic liner, according to an embodiment.

Turning to FIG. 5, a flowchart shows a method of manufacturing the face sheet 110A of the acoustic liner 110 for the gas turbine engine 20. It is to be appreciated that the method may be executed via additive manufacturing, though that is not intended on limiting the scope of the embodiments. As shown in block 510, the method includes defining the sheet body 130 of the face sheet 110A that extends depth-wise from the first surface 120 to the second surface 140, and lengthwise from the forward end 150 to the aft end 160.

As shown in block 520, the method includes defining a through-hole 170 in the sheet body 130, extending from the first surface 120 to the second surface. As also shown in block 520, the hole 170 defines a hole opening 220 at the first surface 120 of the face sheet 110A of the acoustic liner 110, and an elongated edge 250 that extends aft at the hole opening 220. As also shown in block 520, the elongated edge 250 defines a flow ramp surface that tapers toward the first surface 120 and is configured to direct flow toward the first surface 120. As shown in block 530, the method includes defining a lengthwise span of the elongated edge 250 that is proportional to a lengthwise opening span of the hole opening 220. From this, the elongated edge 220 defines a widthwise taper toward the aft end. A shown in block 530A, defining the shape under block 530 may include defining the hole opening 220 that is a circular shape, so that a teardrop shape is defined by the widthwise taper. As shown in block 530B, defining the shape under block 530 may include defining the hole opening 220 that is a slot shape, so that a width-wise center region of the elongated edge 250 defines a constant length ramp. As shown in block 540, the method includes additively manufacturing the face sheet 110a of the acoustic liner 110.

The above embodiments may reduce the disturbance of flow over the hole opening 220 of the face sheet 110A of the acoustic liner 110 along the flow path by providing a shape, such as a teardrop shape, aft of the hole 170, with the utilization of the elongated edge 250. In the case of slots (FIG. 4), which may also be referred to as racetracks, or other forms of holes, passages or perforations, an angled surface forming the flow ramp surface 300 is utilized which also has the widthwise and depth-wise taper.

The forward end 270 of the elongated edge 250 is located at the first end 200 of the hole 170, which tappers in as it reaches the first surface 120, e.g., the original surface flow path. The flow ramp surface 300 is produced that guides the flow 158 back along the flow path with minimal disturbance. The embodiments reduce drag and thereby reduce performance loss due to the utilization of the acoustic treatment. As a result, a higher performing engine 20 is enabled at a given acoustic treatment level. This also enables treating more surface area of an engine 20 exposed to the flow 158 with a corresponding lower efficiency debit. As a result, engine noise and operational cost related to fuel burn may be reduced.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A face sheet of an acoustic liner for a gas turbine engine, comprising:
    a first surface, a second surface, and a sheet body extending from the first surface to the second surface;
    a forward end, an aft end, and the sheet body extending from the forward end to the aft end; and
    a hole formed in the sheet body, extending from the first surface to the second surface, the hole defining a hole opening at the first surface of the face sheet, and
    an elongated edge that extends aft at the hole opening, wherein the elongated edge includes a forward end and an aft end, wherein
        the elongated edge defines a flow ramp surface that tapers depth-wise toward the first surface, between the forward and aft ends of the elongated edge, and is configured to direct flow toward the first surface, wherein
        the flow ramp surface is a streamlining feature, wherein
        the hole opening defines a circular shape or slot shape, and the elongated edge tapers widthwise from the forward end to the aft end to define a frustoconical shape, and wherein between the elongated edge and the second surface, the hole has a constant cross-sectional shape.

2. The face sheet of claim 1, wherein:
    the streamlining feature is aligned with a direction of flow over the face sheet.

3. The face sheet of claim 1, wherein:
    the streamlining feature is offset from a direction of flow over the face sheet.

4. The face sheet of claim 1, wherein
    the hole of the face sheet is defined by:
        a first end at the first surface of the sheet body, a second end at the second surface of the sheet body, a hole wall extending from the first end to the second end, and the hole opening defined by the hole wall at the first surface,
        wherein the hole opening defines a first open area, the hole wall defines a second open area intermediate the first and second surfaces, and the first open area is larger than the second open area to define the elongated edge.

5. The face sheet of claim 4, wherein the elongated edge includes the forward end that is spaced apart from the first surface by a first distance, and the aft end that is aft of the forward end by a second distance and is level with the first surface, thereby forming the flow ramp surface.

6. The face sheet of claim 1, wherein hole opening defines the circular shape, so that a teardrop shape is formed by the widthwise taper.

7. The face sheet of claim 1, wherein
the hole opening defines the slot shape, and the elongated edge forms a constant length ramp.

8. The face sheet of claim 1, further comprising
a plurality of the holes distributed about the face sheet.

9. A gas turbine engine comprising:
an engine component, the engine component including
a flow facing side,
an acoustic liner disposed against the flow facing side, wherein
the acoustic liner includes body and a face sheet, and the face sheet includes:
a first surface, a second surface, and a sheet body extending from the first surface to the second surface, wherein the first surface is a flow facing surface and the second surface faces the body of the acoustic liner;
a forward end, an aft end, and the sheet body extending from the forward end to the aft end; and
a hole formed in the sheet body, extending from the first surface to the second surface, the hole defining
a hole opening at the first surface of the face sheet, and
an elongated edge that extends aft at the hole opening wherein
the elongated edge includes a forward end and an aft end, wherein
the elongated edge defines a flow ramp surface that tapers depth-wise toward the first surface, between the forward and aft ends of the elongated edge, and is configured to direct flow toward the first surface, wherein
the flow ramp surface is a streamlining feature, wherein
the hole opening defines a circular shape or slot shape, and the elongated edge tapers widthwise from the forward end to the aft end to define a frustoconical shape, and wherein
between the elongated edge and the second surface, the hole has a constant cross-sectional shape.

10. The engine of claim 9, wherein
the hole of the face sheet is defined by:
a first end at the first surface of the sheet body, a second end at the second surface of the sheet body, a hole wall extending from the first end to the second end, and the hole opening defined by the hole wall at the first surface,
wherein the hole opening defines a first open area, the hole wall defines a second open area intermediate the first and second surfaces, and the first open area is larger than the second open area to define the elongated edge.

11. The engine of claim 10, wherein the elongated edge includes the forward end that is spaced apart from the first surface by a first distance, and the aft end that is aft of the forward end by a second distance and is level with the first surface, thereby forming the flow ramp surface.

12. The engine of claim 11, wherein
the elongated edge defines a widthwise taper toward the aft end.

13. The engine of claim 12, wherein the hole opening defines the circular shape.

14. The engine of claim 12, wherein the hole opening defines the slot shape, and the elongated edge forms a constant length ramp.

15. The engine of claim 11, further comprising
a plurality of the holes distributed about the face sheet.

16. The engine of claim 11, wherein
the engine component is a nacelle.

17. A method of manufacturing the face sheet of an acoustic liner for a gas turbine engine, comprising:
defining a sheet body, of a face sheet, that extends from a first surface to a second surface and from a forward end to an aft end;
defining a hole in the sheet body, extending from the first surface to the second surface, the hole defining a hole opening at the first surface of the face sheet, and
an elongated edge that extends aft at the hole opening, wherein the elongated edge includes a forward end and an aft end,
wherein the elongated edge defines a flow ramp surface that tapers depth-wise toward the first surface, between the forward and aft ends of the elongated edge, and is configured to direct flow toward the first surface,
wherein the flow ramp surface is a streamlining feature,
wherein the hole opening defines a circular shape or slot shape, and the elongated edge tapers widthwise from the forward end to the aft end to define a frustoconical shape, and
wherein between the elongated edge and the second surface, the hole has a constant cross-sectional shape; and
additively manufacturing the face sheet.

18. The method of claim 17, wherein
the elongated edge defines a widthwise taper toward the aft end.

19. The method of claim 18, including
defining the hole opening that is the circular shape; or
defining the hole opening that is the slot shape, and the elongated edge defines a constant length ramp.

* * * * *